(12) United States Patent
Yamamoto

(10) Patent No.: US 12,489,870 B2
(45) Date of Patent: Dec. 2, 2025

(54) VEHICLE SURROUNDING MONITORING APPARATUS, VEHICLE SURROUNDING MONITORING METHOD, COMPUTER-READABLE STORAGE MEDIUM STORING VEHICLE SURROUNDING MONITORING PROGRAM

(71) Applicants: TOYOTA JIDOSHA KABUSHIKI KAISHA, Toyota (JP); DENSO CORPORATION, Kariya (JP)

(72) Inventor: Yuki Yamamoto, Toyota (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 132 days.

(21) Appl. No.: 18/504,698

(22) Filed: Nov. 8, 2023

(65) Prior Publication Data

US 2024/0187556 A1    Jun. 6, 2024

(30) Foreign Application Priority Data

Dec. 6, 2022 (JP) .................................. 2022-194779

(51) Int. Cl.
| | |
|---|---|
| *H04N 7/18* | (2006.01) |
| *B60R 1/23* | (2022.01) |
| *G06V 20/56* | (2022.01) |
| *G06V 20/58* | (2022.01) |

(52) U.S. Cl.
CPC ............... *H04N 7/183* (2013.01); *B60R 1/23* (2022.01); *G06V 20/582* (2022.01); *G06V 20/588* (2022.01)

(58) Field of Classification Search
CPC ...... H04N 7/183; B60R 1/23; B60R 2300/70; B60R 1/22; B60R 2300/306; B60R 2300/804; G06V 20/582; G06V 20/588; G06V 20/56

See application file for complete search history.

(56) References Cited

U.S. PATENT DOCUMENTS

| | | |
|---|---|---|
| 9,969,261 B2 | 5/2018 | Kodama |
| 10,045,173 B1 | 8/2018 | Morimura et al. |
| 10,106,157 B2 | 10/2018 | Sawada et al. |
| 10,150,407 B2 | 12/2018 | Takahashi et al. |
| 10,696,297 B2 | 6/2020 | Nguyen Van et al. |
| 11,001,255 B2 | 5/2021 | Fukuman et al. |

(Continued)

FOREIGN PATENT DOCUMENTS

JP    2013-109505 A    6/2013

*Primary Examiner* — James M Pontius
(74) *Attorney, Agent, or Firm* — Sughrue Mion, PLLC

(57) ABSTRACT

A vehicle surrounding monitoring apparatus comprises an image acquisition device which acquires a surrounding image corresponding to an image of a view around an own vehicle, and a displaying device which displays the surrounding image. The vehicle surrounding monitoring apparatus displays the surrounding image by the displaying device when the own vehicle has approached a traffic intersection, and a displaying condition becomes satisfied. The displaying condition corresponds to a condition that a field-of-view value is equal to or smaller than a predetermined field-of-view value. The field-of-view value corresponds to a value which represents a field of view from the own vehicle to the traffic intersection.

9 Claims, 13 Drawing Sheets

(56) References Cited

U.S. PATENT DOCUMENTS

| | | |
|---|---|---|
| 11,110,937 B2 | 9/2021 | Kinoshita et al. |
| 2019/0001968 A1 | 1/2019 | Yorifuji et al. |
| 2019/0344828 A1 | 11/2019 | Omori et al. |
| 2019/0389488 A1 | 12/2019 | Yamada et al. |
| 2020/0184722 A1* | 6/2020 | Watanabe ............... G06T 19/00 |
| 2023/0249707 A1* | 8/2023 | Yoon .................... G06V 20/584 |
| | | 340/425.5 |
| 2024/0288687 A1* | 8/2024 | Grard .................... G03B 11/04 |

* cited by examiner

VEHICLE SURROUNDING MONITORING APPARATUS, VEHICLE SURROUNDING MONITORING METHOD, COMPUTER-READABLE STORAGE MEDIUM STORING VEHICLE SURROUNDING MONITORING PROGRAM

CROSS-REFERENCE TO RELATED APPLICATIONS

This application claims priority to Japanese patent application No. JP 2022-194779 filed on Dec. 6, 2022, the content of which is hereby incorporated by reference in its entirety.

BACKGROUND

Field

The present invention relates to a vehicle surrounding monitoring apparatus, a vehicle surrounding monitoring method, and a computer-readable storage medium storing a vehicle surrounding monitoring program.

Description of the Related Art

There is known a vehicle surrounding monitoring apparatus which assists a driving operation carried out by a driver of an own vehicle by displaying camera images (i.e., images of views around the own vehicle taken by cameras) on a display provided in the own vehicle. As the vehicle surrounding monitoring apparatus, there is known a vehicle surrounding monitoring apparatus which displays the camera images of left and right sides of the own vehicle on the display when the driver operates a blinker lever to turn the own vehicle left or right (for example, refer to JP 2013-109505 A).

If there are buildings on the sides of the own vehicle when the own vehicle has approached a traffic intersection, blind areas for the driver occur due to the buildings, and a field of view of the driver becomes narrow. In this case, a surrounding image (i.e., the camera image of the view around the own vehicle, in particular, on the sides of the own vehicle) should be displayed on the display such that the driver can obtain information on the blind areas. In this regard, if such a surrounding image is unnecessarily displayed, the driver may feel bothersome.

SUMMARY

An object of the present invention is to provide a vehicle surrounding monitoring apparatus, a vehicle surrounding monitoring method, and a computer-readable storage medium storing a vehicle surrounding monitoring program which can prevent the driver from feeling bothersome due to a fact that the surrounding image of the view around the own vehicle are displayed when the own vehicle has approached the traffic intersection.

According to the present invention, a vehicle surrounding monitoring apparatus comprises an image acquisition device which acquires a surrounding image corresponding to an image of a view around an own vehicle, a displaying device which displays the surrounding image, and an electronic control unit which controls activations of the displaying device. The electronic control unit is configured to display the surrounding image by the displaying device when the own vehicle has approached a traffic intersection, and a displaying condition becomes satisfied. The displaying condition corresponds to a condition that a field-of-view value is equal to or smaller than a predetermined field-of-view value. The field-of-view value corresponds to a value which represents a field of view from the own vehicle to the traffic intersection.

If the surrounding image is continuously displayed by the displaying device, the driver of the own vehicle may feel bothersome. With the vehicle surrounding monitoring apparatus according to the present invention, the surrounding image is displayed when the own vehicle has approached the traffic intersection, and the field of view to the traffic intersection is low. Thus, the driver can be prevented from feeling bothersome due to a fact that the surrounding image is displayed.

According to an aspect of the present invention, the field-of-view value may correspond to a value which decreases as a lateral distance decreases, and decreases as a longitudinal distance decreases. In this aspect, the lateral distance may correspond to a distance between the own vehicle and a lateral end of a road on which the own vehicle is moving. Further, in this aspect, the longitudinal distance may correspond to a distance between the traffic intersection and an intersection-side end of an interrupting object existing on the side of the own vehicle, and the intersection-side end corresponds to an end of the interrupting object close to the traffic intersection.

When the distance between the own vehicle and the end of the road on which the own vehicle is moving, is short, the field of view to the traffic intersection is narrow. In this case, the surrounding image should be displayed by the displaying device. Further, when the distance between the traffic intersection and the end of the interrupting object which exists on the side of the own vehicle and is close to the traffic intersection, is short, the field of view to the traffic intersection is narrow. In this case, the surrounding image should be displayed by the displaying device.

With the vehicle surrounding monitoring apparatus according to this aspect of the present invention, as the distance between the own vehicle and the end of the road on which the own vehicle is moving, decreases, the field-of-view value decreases. Thus, the surrounding image is likely to be displayed by the displaying device. Further, with the vehicle surrounding monitoring apparatus according to this aspect of the present invention, as the distance between the traffic intersection and the end of the interrupting object which exists on the side of the own vehicle and is close to the traffic intersection, decreases, the field-of-view value decreases. Thus, the surrounding image is likely to be displayed by the displaying device. Therefore, as the field of view to the traffic intersection decreases, the surrounding image is more likely to be displayed by the displaying device.

Thus, the driver can be prevented from feeling bothersome due to a fact that the surrounding image is displayed.

According to another aspect of the present invention, the electronic control unit may be configured to determine whether the own vehicle has approached the traffic intersection based on the surrounding image and acquire the field-of-view value based on the surrounding image.

In addition to the surrounding image, reflected wave information on electromagnetic waves such as radio waves and sonic waves can be used as information on a situation around the own vehicle. In this regard, in order to accurately determine whether the own vehicle has approached the traffic intersection, or determine the field of view to the traffic intersection, the surrounding image should be used rather than the reflected wave information on the electromagnetic waves.

With the vehicle surrounding monitoring apparatus according to this aspect of the present invention, the surrounding image is used to determine whether the own vehicle has approached the traffic intersection and determine the field-of-view value. Thus, the vehicle surrounding monitoring apparatus can accurately determine whether the own vehicle has approached the traffic intersection and acquire the field-of-view value which accurately represents the field of view to the traffic intersection.

According to further another aspect of the invention, the electronic control unit may be configured to determine that the own vehicle has approached the traffic intersection when the electronic control unit detects at least one of a road sign and a road surface marking which show that the traffic intersection exists ahead of the own vehicle.

Some road signs and some road surface markings show that the traffic intersection exists. The vehicle surrounding monitoring apparatus according to this aspect of the present invention determines that the own vehicle has approached the traffic intersection when the vehicle surrounding monitoring apparatus detects the road sign or the road surface marking showing that the traffic intersection exists ahead of the own vehicle. Thereby, the vehicle surrounding monitoring apparatus can accurately determine whether the own vehicle has approached the traffic intersection.

According to further another aspect of the invention, the displaying condition may include (i) a condition that the own vehicle is moving on a non-priority road, (ii) a condition that an intersection distance is equal to or smaller than a first intersection distance threshold, and (iii) a condition that a moving speed of the own vehicle is equal to or smaller than a predetermined speed threshold. In this aspect, the intersection distance may correspond to a distance between the own vehicle and the traffic intersection. Further, in this aspect, the displaying condition may include (i) a condition that the own vehicle is moving on a priority road and (ii) a condition that the intersection distance is equal to or smaller than a second intersection distance threshold, but does not include any condition relating to the moving speed of the own vehicle.

When the own vehicle has approached the traffic intersection in a situation where the own vehicle is moving on the non-priority road, the driver decelerates the own vehicle. Therefore, in the situation where the own vehicle is moving on the non-priority road, the surrounding image does not need to be displayed by the displaying device when the moving speed of the own vehicle is high.

On the other hand, in a situation where the own vehicle is moving on the priority road, the driver is unlikely to decelerate the own vehicle even when the own vehicle has approached the traffic intersection unless a movement of the own vehicle is restricted by a traffic signal and the like. Therefore, in the situation where the own vehicle is moving on the priority road, the surrounding image should be displayed by the displaying device, independently of the moving speed of the own vehicle.

With the vehicle surrounding monitoring apparatus according to this aspect of the present invention, the displaying condition includes the condition that the own vehicle is moving on the non-priority road, the condition that the intersection distance is equal to or smaller than the first intersection distance threshold, and the condition that the moving speed of the own vehicle is equal to or smaller than the predetermined speed threshold. Therefore, the surrounding image is not displayed by the displaying device when the surrounding image does not need to be displayed by the displaying device. Thus, unnecessarily displaying the surrounding image can be prevented.

On the other hand, with the vehicle surrounding monitoring apparatus according to this aspect of the present invention, the displaying condition includes the condition that the own vehicle is moving on the priority road and the condition that the intersection distance is equal to or smaller than the second intersection distance threshold, but does not include any condition relating to the moving speed of the own vehicle. Therefore, the surrounding image is displayed by the displaying device, independently of the moving speed of the own vehicle when the distance between the own vehicle and the traffic intersection becomes short. Thus, the surrounding image can be suitably displayed by the displaying device.

According to further another aspect of the invention, the electronic control unit may be configured to terminate displaying the surrounding image by the displaying device when a displaying termination condition becomes satisfied. In this aspect, the displaying termination condition may include at least one of (i) a condition that a driver of the own vehicle requests to terminate displaying the surrounding image by the displaying device, (ii) a condition that a moving speed of the own vehicle is equal to or greater than a displaying termination speed threshold, (iii) a condition that a displaying duration period of time is equal to or greater than a displaying termination period-of-time threshold, and (iv) a condition that the electronic control unit determines that the own vehicle has passed the traffic intersection based on a position of the own vehicle and map information. Further, in this aspect, the displaying duration period of time may correspond to a period of time which elapses since the surrounding image starts being displayed by the dis playing device.

If the surrounding image unnecessarily continues being displayed by the displaying device, the driver may feel bothersome. With the vehicle surrounding monitoring apparatus according to this aspect of the present invention, when the driver of the own vehicle requests to terminate displaying the surrounding image by the displaying device, or when the moving speed of the own vehicle is equal to or greater than the displaying termination speed threshold, or when the displaying duration period of time is equal to or greater than the displaying termination period-of-time threshold, or when the electronic control unit determines that the own vehicle has passed the traffic intersection based on the position of the own vehicle and the map information, displaying the surrounding image is terminated. Thus, displaying the surrounding image can be suitably terminated.

Further, a vehicle surrounding monitoring method according to the present invention is a method for acquiring a surrounding image corresponding to an image of a view around an own vehicle by an image acquisition device, and displaying the surrounding image by a displaying device. The vehicle surrounding monitoring method according to the present invention comprises a step of displaying the surrounding image by the displaying device when the own vehicle has approached a traffic intersection, and a displaying condition becomes satisfied. The displaying condition corresponds to a condition that a field-of-view value is equal to or smaller than a predetermined field-of-view value. The field-of-view value corresponds to a value which represents a field of view from the own vehicle to the traffic intersection.

With the vehicle surrounding monitoring method according to the present invention, for the same reason described above, the driver can be prevented from feeling bothersome due to a fact that the surrounding image is displayed.

A computer-readable storage medium according to the present invention stores a vehicle surrounding monitoring program of acquiring a surrounding image corresponding to an image of a view around an own vehicle by an image acquisition device, and displaying the surrounding image by a displaying device. The vehicle surrounding monitoring program is configured to display the surrounding image by the displaying device when the own vehicle has approached a traffic intersection, and a displaying condition becomes satisfied. The displaying condition corresponds to a condition that a field-of-view value is equal to or smaller than a predetermined field-of-view value. The field-of-view value corresponds to a value which represents a field of view from the own vehicle to the traffic intersection.

With the vehicle surrounding monitoring programs stored in the computer-readable storage medium according to the present invention, for the same reason described above, the driver can be prevented from feeling bothersome due to a fact that the surrounding image is displayed.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
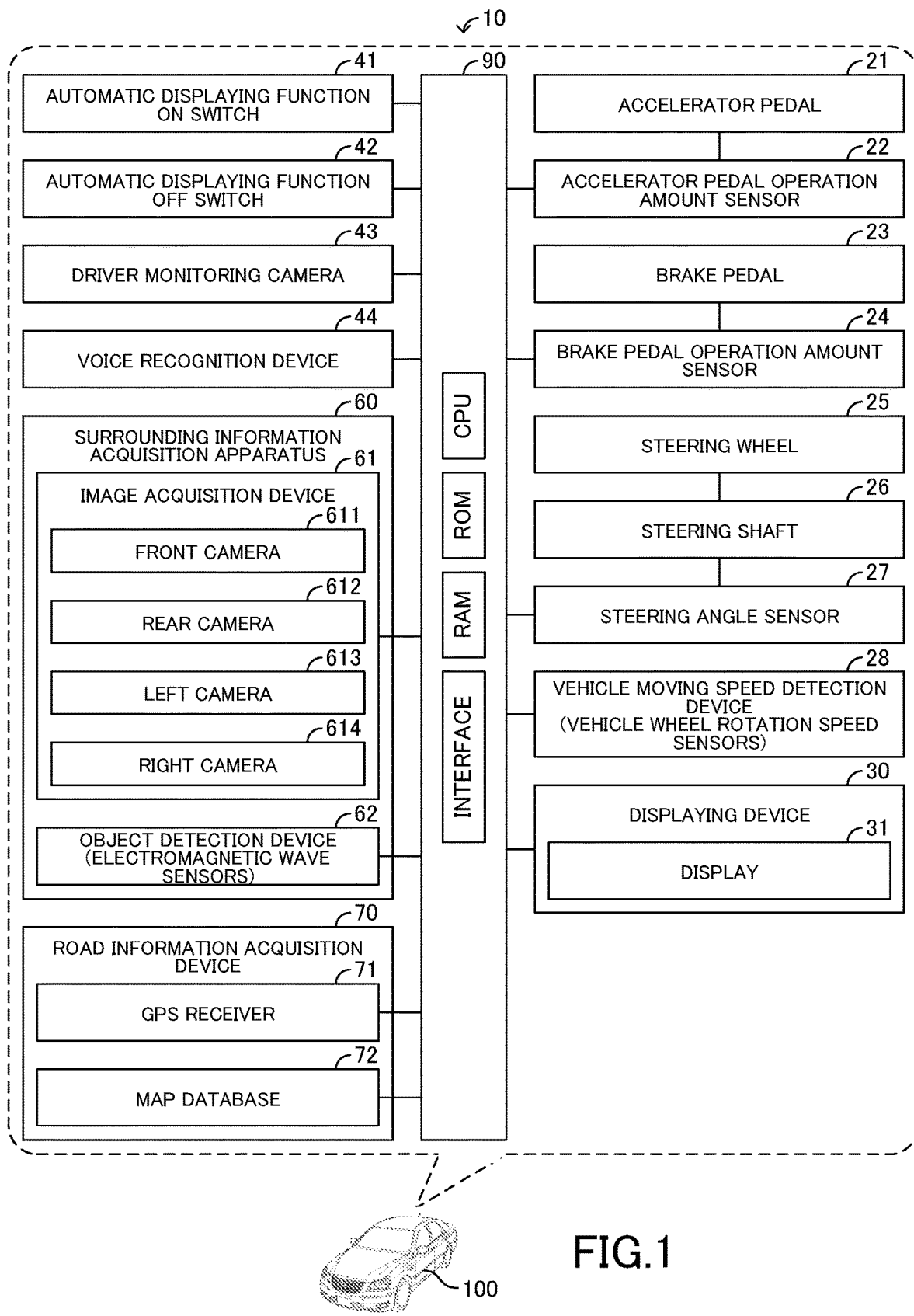
FIG. 1 is a view which shows a vehicle surrounding monitoring apparatus according to an embodiment of the present invention.

Below, a vehicle surrounding monitoring apparatus, a vehicle surrounding monitoring method, and a computer-readable storage medium storing a vehicle surrounding monitoring program according to an embodiment of the present invention, will be described with reference to the drawings. As shown in FIG. 1, the vehicle surrounding monitoring apparatus 10 according to the embodiment of the present invention is installed on an own vehicle 100. It should be noted that the vehicle surrounding monitoring apparatus, the vehicle surrounding monitoring method, and the computer-readable storage medium storing the vehicle surrounding monitoring program according to the embodiment of the present invention, can be applied to a case where a driver of the own vehicle 100 is directly driving the own vehicle 100 which can be automatically or autonomously driven by a system.

The vehicle surrounding monitoring apparatus 10 includes an ECU (electronic control unit) 90 as a control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines stored in the ROM. In the present embodiment, the vehicle surrounding monitoring apparatus 10 includes only one ECU. In this regard, the vehicle surrounding monitoring apparatus 10 may include plural ECUs. In this case, the ECUs may share executing various processes described later.

Further, as shown in FIG. 1, the own vehicle 100 is installed with an accelerator pedal 21, an accelerator pedal operation amount sensor 22, a brake pedal 23, a brake pedal operation amount sensor 24, a steering wheel 25, a steering shaft 26, a steering angle 27, and a vehicle moving speed detection device 28.

The accelerator pedal 21 is a device which is operated by the driver to accelerate the own vehicle 100. The accelerator pedal operation amount sensor 22 is a sensor which detects an operation amount of the accelerator pedal 21. The accelerator pedal operation amount sensor 22 is electrically connected to the ECU 90. The ECU 90 acquires the operation amount of the accelerator pedal 21 as an accelerator pedal operation amount AP by the accelerator pedal operation amount sensor 22.

The brake pedal 23 is a device which is operated by the driver to decelerate the own vehicle 100. The brake pedal operation amount sensor 24 is a sensor which detects an operation amount of the brake pedal 23. The brake pedal operation amount sensor 24 is electrically connected to the ECU 90. The ECU 90 acquires the operation amount of the brake pedal 23 as a brake pedal operation amount BP by the brake pedal operation amount sensor 24.

The steering angle sensor 27 is a sensor which detects a rotation angle of the steering shaft 26 with respect to its neutral position. The steering angle sensor 27 is electrically connected to the ECU 90. The steering shaft 26 is operatively connected to the steering wheel 25. The steering shaft 26 is rotated by the driver of the own vehicle 100 operating the steering wheel 25. The ECU 90 acquires the rotation angle of the steering shaft 26 as a steering angle θ by the steering angle sensor 27.

The vehicle moving speed detection device 28 is a device which detects a moving speed of the own vehicle 100. The vehicle moving speed detection device 28 includes, for example, vehicle wheel rotation speed sensors which are provided on each vehicle wheels of the own vehicle 100. The vehicle moving speed detection device 28 is electrically connected to the ECU 90. The ECU 90 acquires the moving speed of the own vehicle 100 as an own vehicle moving speed V by the vehicle moving speed detection device 28.

Figure 2:
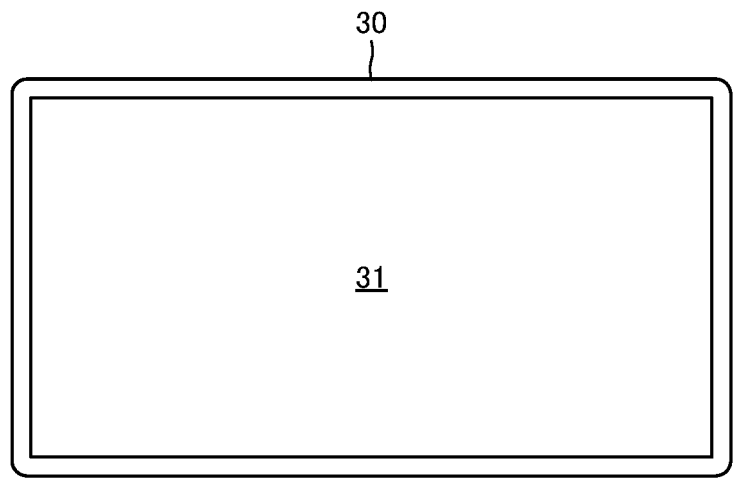
FIG. 2 is a view which shows a displaying device.

In addition, the own vehicle 100 is installed with a displaying device 30. The displaying device 30 is mounted at a position of the own vehicle 100 such that the driver sitting on a driver's seat of the own vehicle 100 can see the displaying device 30. The displaying device 30 is a device which displays various images including a surrounding image IMG_S described later. In the present embodiment, the displaying device 30 includes a display 31 as shown in FIG. 2. In the present embodiment, the display 31 is a display of a so-called car navigation device. The displaying device 30 is electrically connected to the ECU 90. The displaying device 30 displays the image on the display 31 in response to a command sent from the ECU 90.

Furthermore, the own vehicle 100 is installed with an automatic displaying function ON switch 41, an automatic displaying function OFF switch 42, a driver monitoring camera 43, and a voice recognition device 44.

The automatic displaying function ON switch 41 is a device which is operated by the driver of the own vehicle 100 to put the automatic displaying function in an ON-state or an activated state. The automatic displaying function ON switch 41 is electrically connected to the ECU 90. The automatic displaying function is a function of automatically displaying the surrounding image IMG_S described later on the display 31 by the displaying device 30 when a predetermined condition becomes satisfied as described later. When the automatic displaying function ON switch 41 is operated, the ECU 90 determines that the ECU 90 is requested to put the automatic displaying function in the ON-state and puts the automatic displaying function in the ON-state.

The automatic displaying function OFF switch 42 is a device which is operated by the driver of the own vehicle 100 to put the automatic displaying function in an OFF-state or a deactivated state. The automatic displaying function OFF switch 42 is electrically connected to the ECU 90. When the automatic displaying function OFF switch 42 is operated, the ECU 90 determines that the ECU 90 is requested to put the automatic displaying function in the OFF-state and puts the automatic displaying function in the OFF-state.

It should be noted that the automatic displaying function ON switch 41 and the automatic displaying function OFF switch 42 may be combined into a single switch.

The driver monitoring camera 43 is a device which takes an image of the driver sitting on the driver's seat of the own vehicle 100. The driver monitoring camera 43 is electrically connected to the ECU 90. The ECU 90 acquires information or data on the image of the driver taken by the driver monitoring camera 43 as driver image information ID or driver image data.

The voice recognition device 44 is a device which detects a voice of a passenger (in particular, the driver) in the own vehicle 100. The voice recognition device 44 is, for example, a microphone. The voice recognition device 44 is electrically connected to the ECU 90. The voice recognition device 44 acquires information or data on the voice of the passenger (in particular, the driver) in the own vehicle 100 as voice information IV or voice data by the voice recognition device 44.

In addition, the own vehicle 100 is installed with a surrounding information acquisition apparatus 60. The surrounding information acquisition apparatus 60 is an apparatus which acquires information or data on a situation around the own vehicle 100. In the present embodiment, the surrounding information acquisition apparatus 60 includes an image acquisition device 61 and an object detection device 62.

The image acquisition device 61 is a device which acquires the image of the view around the own vehicle 100. In particular, the image acquisition device 61 is a device which takes an image of the view around the own vehicle 100 and acquires image information IC or image data on the situation around the own vehicle 100. In the present embodiment, the image acquisition device 61 includes a front camera 611, a rear camera 612 a left camera 613, and a right camera 614.

Figure 3:
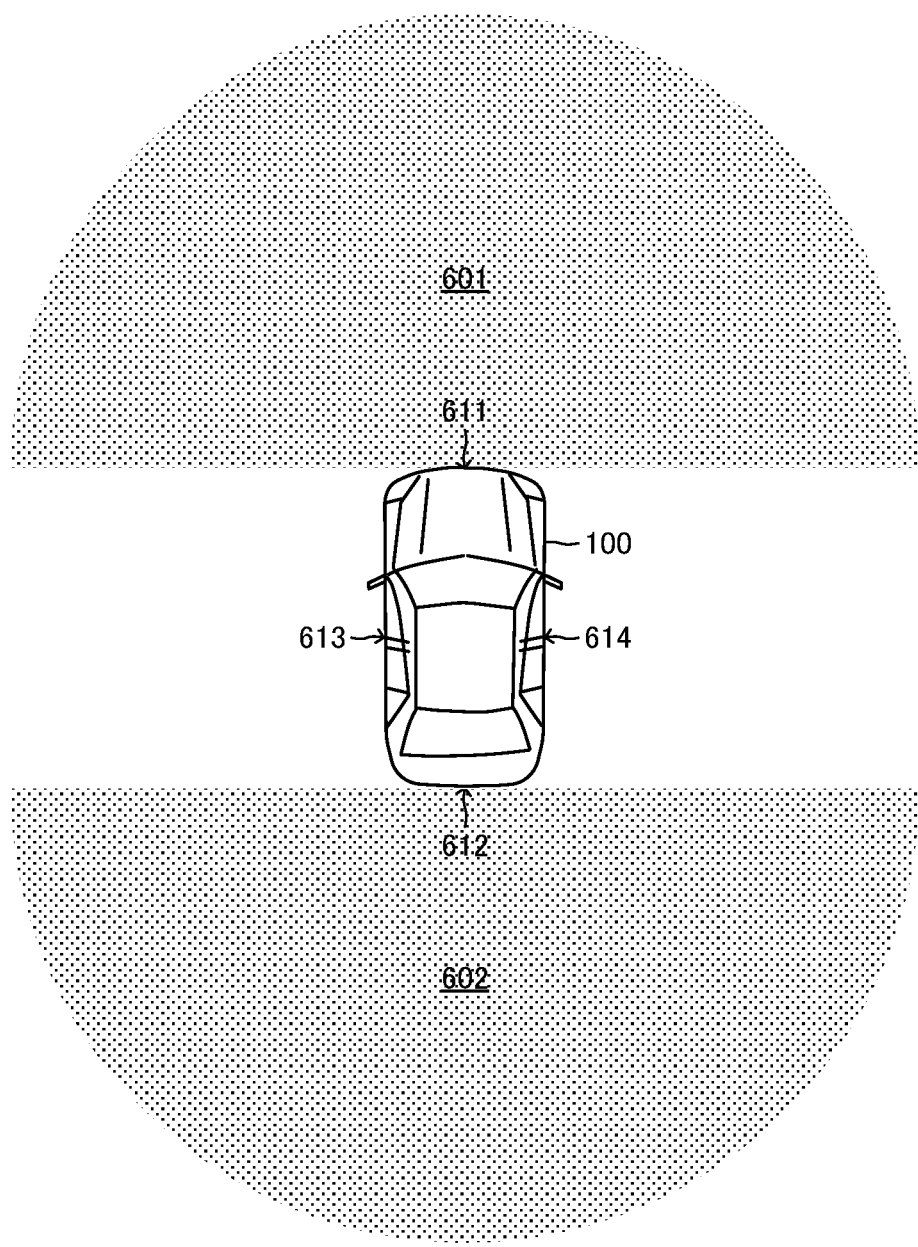
FIG. 3 is a view which shows a front camera and a rear camera.
Figure 4:
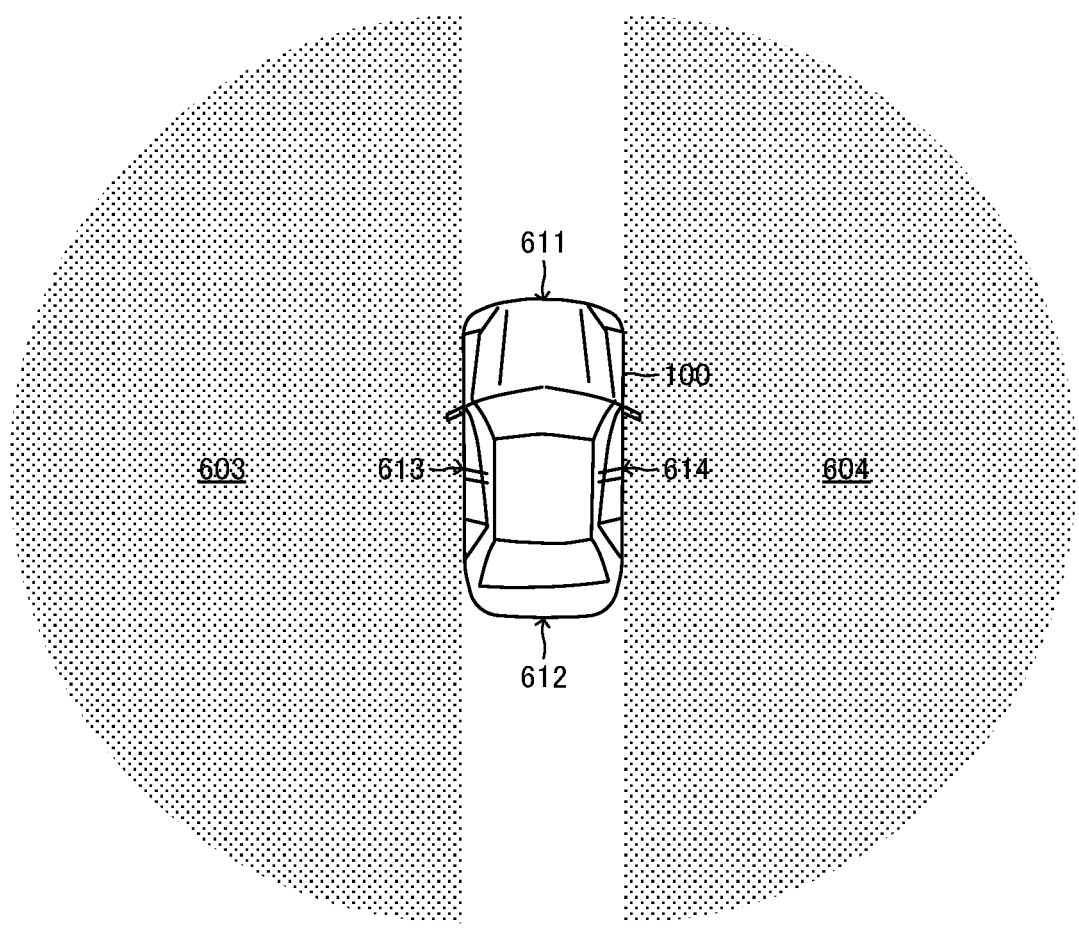
FIG. 4 is a view which shows a left camera and a right camera.

As shown in FIG. 3, the front camera 611 is mounted on the own vehicle 100 so as to take an image of a view in a predetermined range 601 ahead of the own vehicle 100. Further, the rear camera 612 is mounted on the own vehicle 100 so as to take an image of a view in a predetermined range 602 behind the own vehicle 100. Further, as shown in FIG. 4, the left camera 613 is mounted on the own vehicle 100 so as to take an image of a view in a predetermined range 603 on the left side of the own vehicle 100. Further, the right camera 614 is mounted on the own vehicle 100 so as to take an image of a view in a predetermined range 604 on the right side of the own vehicle 100.

A left side area of the predetermined range 601 captured by the front camera 611 partially overlaps a front area of the predetermined range 603 captured by the left camera 613. Further, a right side area of the predetermined range 601 captured by the front camera 611 partially overlaps a front area of the predetermined range 604 captured by the right camera 614. Furthermore, a left side area of the predetermined range 602 captured by the rear camera 612 partially overlaps a rear area of the predetermined range 603 captured by the left camera 613. Furthermore, a right side area of the predetermined range 602 captured by the rear camera 612 partially overlaps a rear area of the predetermined range 604 captured by the right camera 614.

The image acquisition device 61 is electrically connected to the ECU 90. The ECU 90 acquires the image information IC or the image data on the image of situation around the own vehicle 100 taken by the front camera 611, the rear camera 612, the left camera 613, and the right camera 614 of the image acquisition device 61 as surrounding detection information IS. The ECU 90 can display the surrounding image IMG_S (i.e., the image of the view around the own vehicle 100) on the display 31 by the displaying device 30 based on the image information IC.

The object detection device 62 is a device which detects objects around the own vehicle 100. In particular, the object detection device 62 is a device which acquires information or date on the objects around the own vehicle 100 as object information IO or object data. The object detection device 62 includes, for example, electromagnetic wave sensors. The electromagnetic sensors are, for example, radio wave sensors such as radar sensors such as millimeter wave sensors, sonic wave sensors such as ultrasonic wave sensors such as clearance sonars, and optical sensors such as laser radars such as LiDARs.

The object detection device 62 transmits electromagnetic waves. When the transmitted electromagnetic waves are reflected by the objects, the object detection device 62 receives the reflected electromagnetic waves (i.e., reflected waves). The object information IO is information on the transmitted electromagnetic waves and the reflected waves. The object detection device 62 is electrically connected to the ECU 90. The ECU 90 acquires the object information IO or the object data from the object detection device 62 as the surrounding detection information IS.

In addition, the own vehicle 100 is installed with a road information acquisition device 70. The road information acquisition device 70 is a device which acquires information on a road on which the own vehicle 100 is moving as road information IR. In the present embodiment, the road information acquisition device 70 includes a GPS receiver 71 and map database 72.

The GPS receiver 71 is a device which receives GPS signals. The GPS receiver 71 is electrically connected to the ECU 90. The ECU 90 acquires a present position of the own vehicle 100 based on the GPS signals received by the GPS receiver 71.

The map database 72 is a device which stores map information or map data. The map database 72 is electrically connected to the ECU 90. The ECU 90 acquires the map information on an area around the own vehicle 100 as the surrounding detection information IS from the map database 72 based on the present position of the own vehicle 100. In the present embodiment, the map information on the area around the own vehicle 100 includes the road information IR or road data (i.e., information or data on the road on which the own vehicle 100 is moving).

It should be noted that the surrounding information acquisition apparatus 60 may include a device which receives information on the road wirelessly transmitted from a facility provided on a side of the road. In this case, the surrounding information acquisition apparatus 60 may be configured to acquire the information transmitted wirelessly from the facility as the surrounding detection information IS.

<Operations of Vehicle Surrounding Monitoring Apparatus>

Figure 5:
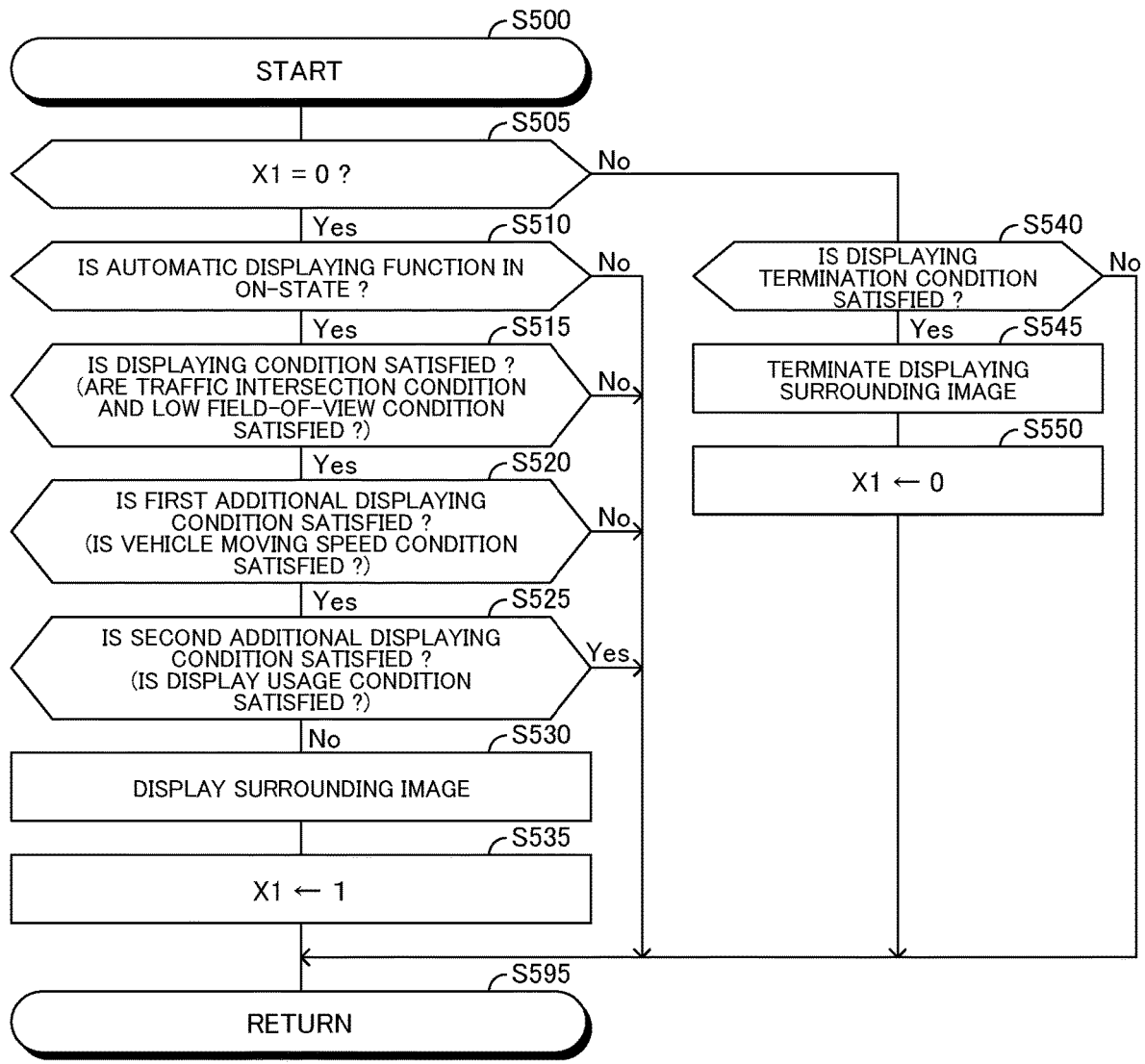
FIG. 5 is a view which shows a flowchart of a routine executed by the vehicle surrounding monitoring apparatus according to the embodiment of the present invention.

Next, operations of the vehicle surrounding monitoring apparatus 10 will be described. The vehicle surrounding monitoring apparatus 10 is configured to execute a routine shown in FIG. 5 with a predetermined calculation cycle. Therefore, at a predetermined point of time, the vehicle surrounding monitoring apparatus 10 starts to execute the routine shown in FIG. 5 from a step S500 and proceeds with the process to a step S505 to determine whether a value of a surrounding image displaying flag is "0." The value of the surrounding image displaying flag X1 is set to "1" when the surrounding image IMG_S is being displayed by the displaying device 30. On the other hand, when the surrounding image IMG_S is not displayed by the displaying device 30, the value of the surrounding image displaying flag X1 is set to "0."

When the vehicle surrounding monitoring apparatus 10 determines "Yes" at the step S505, the vehicle surrounding monitoring apparatus 10 proceeds with the process to a step S510 to determine whether the automatic displaying function is in the ON-state. As described above, the automatic displaying function is put in the ON-state when the automatic displaying function ON switch 41 is operated. On the other hand, when the automatic displaying function OFF switch 42 is operated, the automatic displaying function is put in the OFF-state. It should be noted that a determination process of the step S510 is omitted when the automatic displaying function ON switch 41 and the automatic displaying function OFF switch 42 are not provided, and the vehicle surrounding monitoring apparatus 10 continuously keeps the automatic displaying function in the ON-state.

When the vehicle surrounding monitoring apparatus 10 determines "Yes" at the step S510, the vehicle surrounding monitoring apparatus 10 proceeds with the process to a step S515 to determine whether a displaying condition Cdpy is satisfied. The displaying condition Cdpy includes a traffic intersection condition Cis and a low field-of-view condition Cfov.

The traffic intersection condition Cis corresponds to a condition that the own vehicle 100 has approached a traffic intersection 300. The vehicle surrounding monitoring apparatus 10 determines whether the own vehicle 100 has approached the traffic intersection 300 based on the surrounding detection information IS such as the image information IC and/or the road information IR.

For example, the vehicle surrounding monitoring apparatus 10 detects the traffic intersection 300 ahead of the own vehicle 100 based on the image information IC by executing a process of detecting a road sign or a road surface marking showing that the traffic intersection 300 exists ahead of the own vehicle 100 based on the image information IC. Then, when the vehicle surrounding monitoring apparatus 10 detects the road sign or the road surface marking showing that the traffic intersection 300 exists ahead of the own vehicle 100, the vehicle surrounding monitoring apparatus 10 determines that the own vehicle 100 has approached the traffic intersection 300.

Further, the vehicle surrounding monitoring apparatus 10 detects the traffic intersection 300 ahead of the own vehicle 100 based on the road information IR by executing a process of detecting the traffic intersection 300 ahead of the own vehicle 100 from (i) the present position of the own vehicle 100 acquired based on the GPS signals and (ii) the map information stored in the map database 72. Then, when the vehicle surrounding monitoring apparatus 10 detects the traffic intersection 300 ahead of the own vehicle 100, the vehicle surrounding monitoring apparatus 10 determines that the own vehicle 100 is approaching the traffic intersection 300.

Further, the road sign showing that the traffic intersection 300 exists ahead of the own vehicle 100, includes (i) an information sign which describes the traffic intersection with places past the traffic intersection and directions to the places, (ii) a warning sign which describes the traffic intersection, (iii) a regulatory sign which shows that the vehicle is required to be stopped, and (iv) an indication sign which describes a stop line.

Furthermore, the road surface marking showing that the traffic intersection 300 exists ahead of the own vehicle 100, includes a road surface marking of the stop line, a road surface marking of a crosswalk or a pedestrian crossing, and a road surface marking which notices the crosswalk or the pedestrian crossing ahead.

Figure 6:
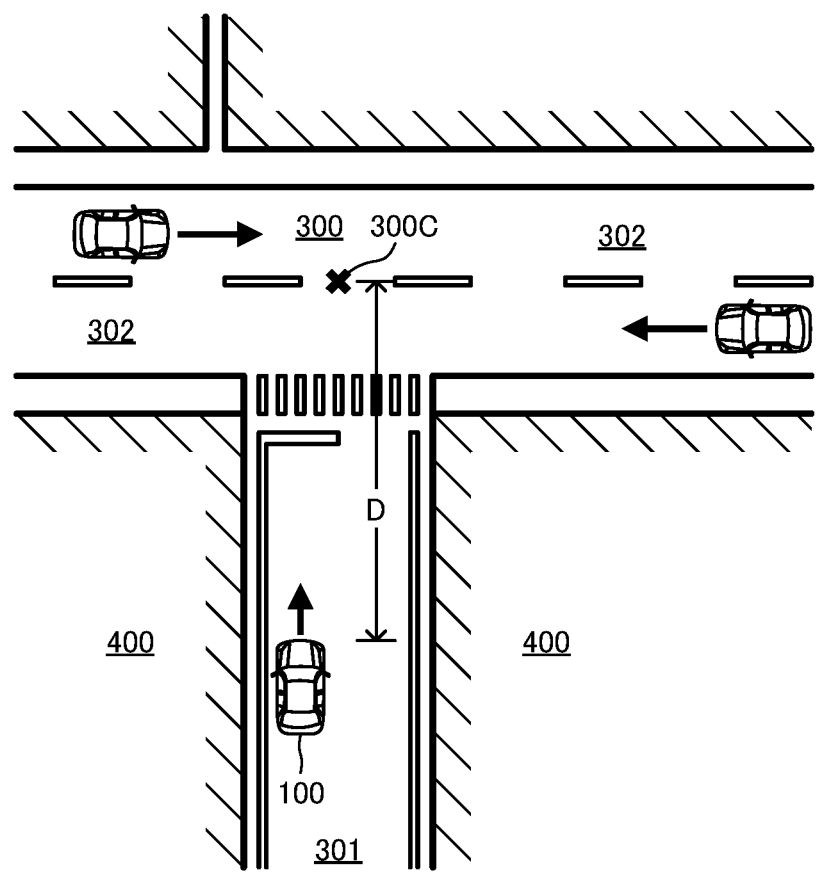
FIG. 6 is a view which shows an example of a traffic intersection.

It should be noted that in the present embodiment, the traffic intersection condition Cis corresponds to a condition that a traffic intersection distance D is equal to or smaller than a predetermined distance or a predetermined traffic intersection distance threshold Dth. As shown in FIG. 6, the traffic intersection distance D corresponds to a distance between the own vehicle 100 and the traffic intersection 300. In particular, in the present embodiment, the traffic intersection distance D corresponds to a distance between a front end of the own vehicle 100 and a center point 300C of the traffic intersection 300. The vehicle surrounding monitoring apparatus 10 detects the traffic intersection 300 based on the surrounding detection information IS and acquires the traffic intersection distance D.

Figure 7:
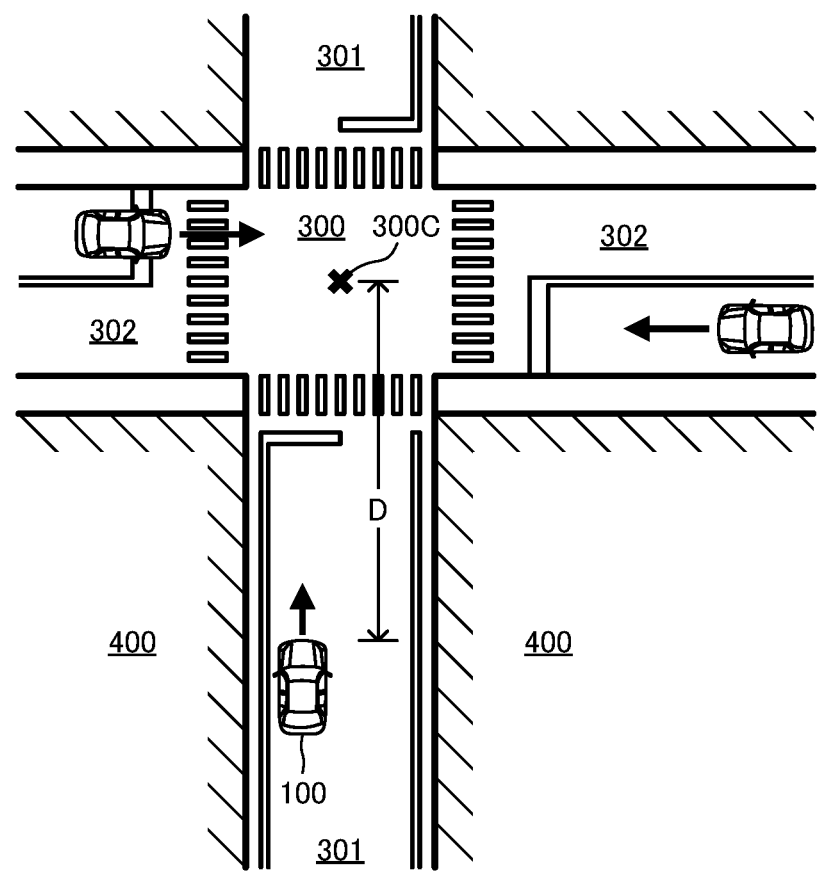
FIG. 7 is a view which shows another example of the traffic intersection.

It should be noted that the traffic intersection 300 includes a T-intersection shown in FIG. 6 and a cross intersection shown in FIG. 7. The T-intersection corresponds to a traffic intersection in which one road 301 connects to the other road 302 without passing the road 302. The cross intersection corresponds to a traffic intersection in which one road 301 passes the other road 302. It should be noted that in an example shown in FIG. 6, the road 301 corresponds to a non-priority road, and the road 302 corresponds to a priority road. Further, it should be noted that whether the road on which the own vehicle 100 is moving, is the priority road or the non-priority road, can be determined, for example, based on the road surface marking detected based on the image information IC.

Further, the low field-of-view condition Cfov corresponds to a condition that a field-of-view value is equal to or smaller than a predetermined value or a predetermined field-of-view threshold FOVth. In particular, in the present embodiment, the low field-of-view condition Cfov corresponds to a condition that a left field-of-view value FOV_L is equal to or smaller than a predetermined value or a predetermined left field-of-view threshold FOV_Lth, or a right field-of-view value FOV_R is equal to or smaller than a predetermined value or a predetermined right field-of-view threshold FOV_Rth.

Figure 8:
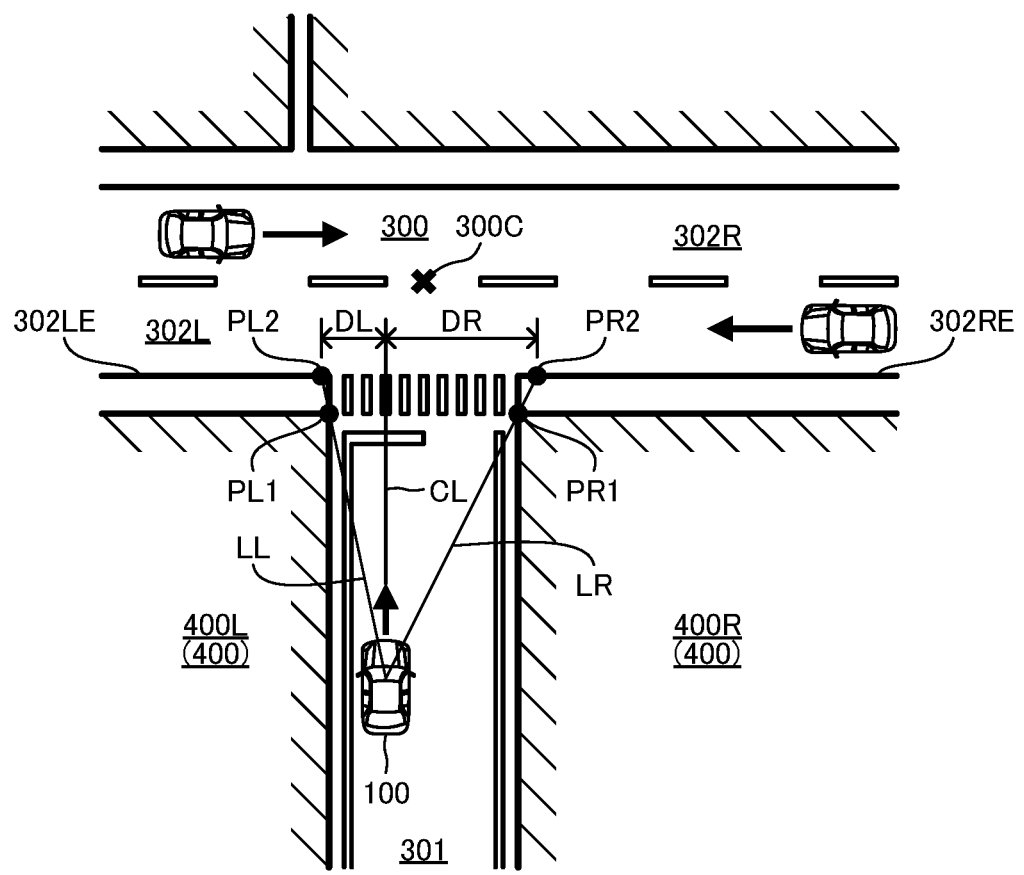
FIG. 8 is a view used for describing a method of acquiring a field-of-view value, and which shows a scene that an own vehicle has approached the traffic intersection.

The field-of-view value FOV corresponds to a value which represents a field of view of the driver of the own vehicle 100 to the traffic intersection 300. Further, when the traffic intersection 300 corresponds to a traffic intersection having a left side to which a road 302L connects, viewing from the own vehicle 100 as shown in FIG. 8, the left field-of-view value FOV_L corresponds to a value which represents the field of view of the driver of the own vehicle 100 to the road 302L. Furthermore, when the traffic intersection 300 corresponds to a traffic intersection having a right side to which a road 302R connects, viewing from the own vehicle 100 as shown in FIG. 8, the right field-of-view value FOV_R corresponds to a value which represents the field of view of the driver of the own vehicle 100 to the road 302R.

The vehicle surrounding monitoring apparatus 10 acquires the field-of-view value FOV as described below.

When the traffic intersection 300 corresponds to a traffic intersection having the left side to which the road 302L connects, viewing from the own vehicle 100, the vehicle surrounding monitoring apparatus 10 executes a process of detecting a left interrupting object 400L based on the surrounding detection information IS. As shown in FIG. 8, the left interrupting object 400L corresponds to an interrupting object 400 existing on the left side of the own vehicle 100. It should be noted that in the present embodiment, the traffic intersection 300 is, for example, a building.

When the vehicle surrounding monitoring apparatus 10 detects the left interrupting object 400L, the vehicle surrounding monitoring apparatus 10 detects a left interrupting object end PL1 of the detected left interrupting object 400L based on the surrounding detection information IS. As shown in FIG. 8, the left interrupting object end PL1 corresponds to an end of the left interrupting object 400L on the side of the traffic intersection 300.

It should be noted that when the vehicle surrounding monitoring apparatus 10 detects the plural left interrupting objects 400L, the vehicle surrounding monitoring apparatus 10 detects the end of the closest detected left interrupting object 400L to the traffic intersection 300 as the left interrupting object end PL1.

Next, the vehicle surrounding monitoring apparatus 10 detects a left intersecting point PL2 based on the surrounding detection information IS. As shown in FIG. 8, the left intersecting point PL2 corresponds to an intersecting point of a line LL and a left intersecting road end 302LE. The line LL corresponds to a line which passes the left interrupting object end PL1 and the own vehicle 100. The left intersecting road end 302LE corresponds to a road end of the road 302L on the side of the left interrupting object 400L. As described above, the road 302L corresponds to a road which connects to the left side of the traffic intersection 300, viewing from the own vehicle 100.

Next, the vehicle surrounding monitoring apparatus 10 acquires a left intersecting point distance DL as the left field-of-view value FOV_L based on the left intersecting point PL2. As shown in FIG. 8, the left intersecting point distance DL corresponds to a distance between the left intersecting point PL2 and the own vehicle 100 in a width direction or a lateral direction of the own vehicle 100. In particular, in the present embodiment, the left intersecting point distance DL corresponds to a distance between the left intersecting point PL2 and a center line CL. The center line CL corresponds to a line which extends in a longitudinal direction of the own vehicle 100.

Similarly, when the traffic intersection 300 corresponds to a traffic intersection having the right side to which the road 302R connects, viewing from the own vehicle 100, the vehicle surrounding monitoring apparatus 10 executes a process of detecting a right interrupting object 400R based on the surrounding detection information IS. As shown in FIG. 8, the right interrupting object 400R corresponds to an interrupting object 400 existing on a right side of the own vehicle 100.

When the vehicle surrounding monitoring apparatus 10 detects the right interrupting object 400R, the vehicle surrounding monitoring apparatus 10 detects a right interrupting object end PR1 of the detected right interrupting object 400R based on the surrounding detection information IS. As shown in FIG. 8, the right interrupting object end PR1 corresponds to an end of the right interrupting object 400R on the side of the traffic intersection 300.

It should be noted that when the vehicle surrounding monitoring apparatus 10 detects the plural right interrupting objects 400R, the vehicle surrounding monitoring apparatus 10 detects the end of the closest detected right interrupting object 400R to the traffic intersection 300 as the right interrupting object end PR1.

Next, the vehicle surrounding monitoring apparatus 10 detects a right intersecting point PR2 based on the surrounding detection information IS. As shown in FIG. 8, the right intersecting point PR2 corresponds to an intersecting point of a line LR and a right intersecting road end 302RE. The line LR corresponds to a line which passes the right interrupting object end PR1 and the own vehicle 100. The right intersecting road end 302RE corresponds to a road end of the road 302R on the side of the right interrupting object 400R. As described above, the road 302R corresponds to a road which connects to the right side of the traffic intersection 300, viewing from the own vehicle 100.

Next, the vehicle surrounding monitoring apparatus 10 acquires a right intersecting point distance DR as the right field-of-view value FOV_R based on the right intersecting point PR2. As shown in FIG. 8, the right intersecting point distance DR corresponds to a distance between the right intersecting point PR2 and the own vehicle 100 in the width direction or the lateral direction of the own vehicle 100. In particular, in the present embodiment, the right intersecting point distance DR corresponds to a distance between the right intersecting point PR2 and the center line CL which extends in the longitudinal direction of the own vehicle 100.

The acquired field-of-view value FOV decreases as a longitudinal distance decreases. The longitudinal distance corresponds to a distance between the traffic intersection 300 and an intersection-side end of the interrupting object 400 existing on the side of the own vehicle 100. The intersection-side end of the interrupting object 400 existing on the side of the own vehicle 100 corresponds to an end of the interrupting object 400 near the traffic intersection 300. In addition, the acquired field-of-view value FOV decreases as a lateral distance decreases. The lateral distance corresponds to a distance between the own vehicle 100 and the interrupting object 400 existing on the side of the own vehicle 100.

Figure 9:
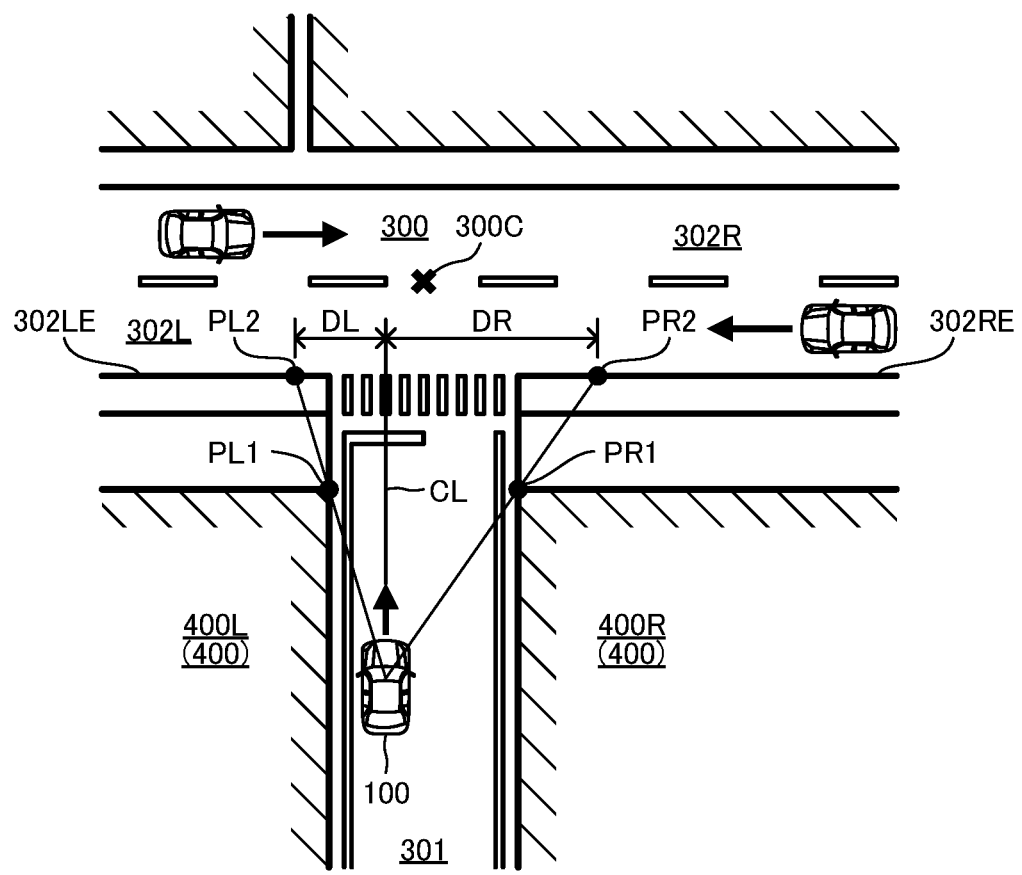
FIG. 9 is a view which shows a scene that the own vehicle has approached the traffic intersection and in which a distance between each interrupting object and the traffic intersection is greater than the distance between each interrupting object and the traffic intersection shown in FIG. 8.

That is, when comparing examples shown in FIG. 8 and FIG. 9, the left interrupting object end PL1 of the example shown in FIG. 8 is closer to the traffic intersection 300, compared with the left interrupting object end PL1 of the example shown in FIG. 9. In this case, the left intersecting point distance DL of the example shown in FIG. 8 is shorter than the left intersecting point distance DL of the example shown in FIG. 9. Therefore, the left field-of-view value FOV_L of the example shown in FIG. 8 is smaller than the left field-of-view value FOV_L of the example shown in FIG. 9. That is, the left-side field of view from the own vehicle 100 to the traffic intersection 300 in the example shown in FIG. 8 is narrower than the left-side field of view from the own vehicle 100 to the traffic intersection 300 in the example shown in FIG. 9.

Similarly, when comparing the examples shown in FIG. 8 and FIG. 9, the right interrupting object end PR1 of the example shown in FIG. 8 is closer to the traffic intersection 300, compared with the right interrupting object end PR1 of the example shown in FIG. 9. In this case, the right intersecting point distance DR of the example shown in FIG. 8 is shorter than the right intersecting point distance DR of the example shown in FIG. 9. Therefore, the right field-of-view value FOV_R of the example shown in FIG. 8 is smaller than the right field-of-view value FOV_R of the example shown in FIG. 9. That is, the right-side field of view from the own vehicle 100 to the traffic intersection 300 in the example shown in FIG. 8 is narrower than the right-side field of view from the own vehicle 100 to the traffic intersection 300 in the example shown in FIG. 9.

Therefore, the field-of-view value FOV decreases as the longitudinal distance (i.e., the distance between the traffic intersection 300 and the intersection-side end of the interrupting object 400 existing on the side of the own vehicle 100, which end being near the traffic intersection 300) decreases.

Figure 10:
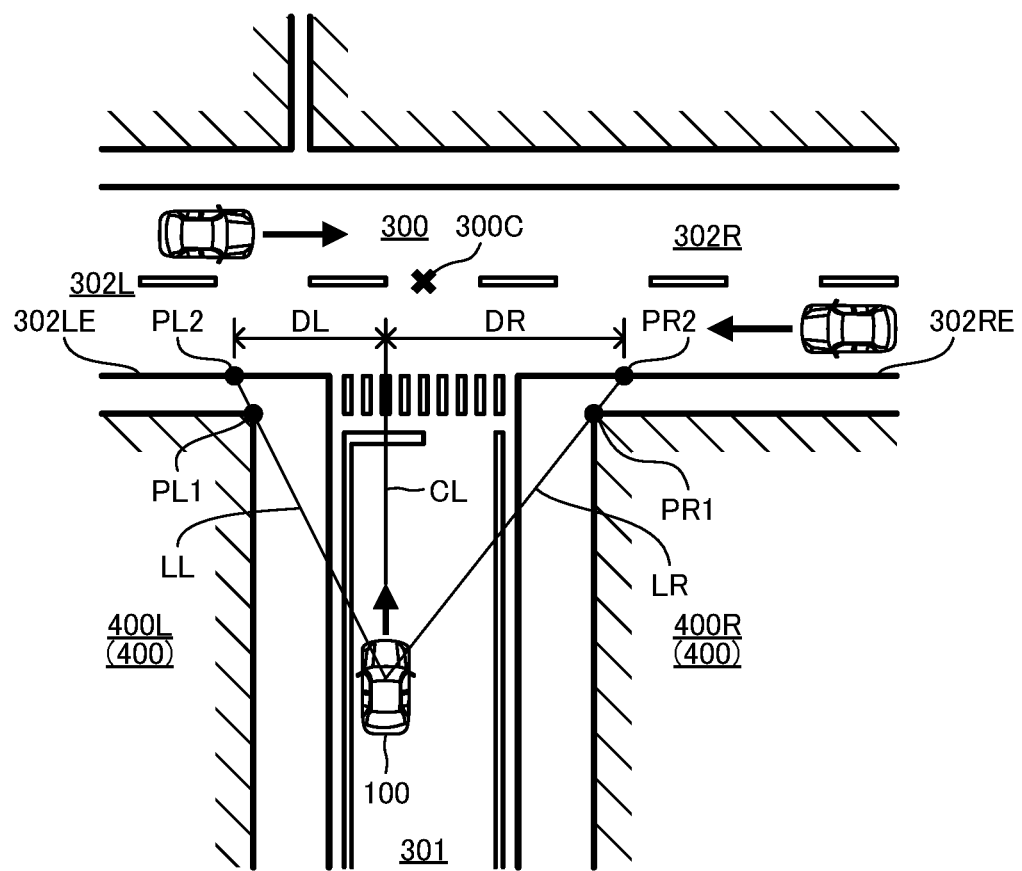
FIG. 10 is a view which shows a scene that the own vehicle has approached the traffic intersection and in which a distance between each interrupting object and the own vehicle is greater than the distance between each interrupting object and the own vehicle shown in FIG. 8.

Further, when comparing the example shown in FIG. 8 and an example shown in FIG. 10, the left interrupting object end PL1 of the example shown in FIG. 8 is closer to the own vehicle 100, compared with the left interrupting object end PL1 of the example shown in FIG. 10. In this case, the left intersecting point distance DL of the example shown in FIG. 8 is shorter than the left intersecting point distance DL of the example shown in FIG. 10. Therefore, the left field-of-view value FOV_L of the example shown in FIG. 8 is smaller than the left field-of-view value FOV_L of the example shown in FIG. 10. That is, the left-side field of view from the own vehicle 100 to the traffic intersection 300 in the example shown in FIG. 8 is narrower than the left-side field of view from the own vehicle 100 to the traffic intersection 300 in the example shown in FIG. 10.

Similarly, when comparing the examples shown in FIG. 8 and FIG. 10, the right interrupting object end PR1 of the example shown in FIG. 8 is closer to the own vehicle 100, compared with the right interrupting object end PR1 of the example shown in FIG. 10. In this case, the right intersecting point distance DR of the example shown in FIG. 8 is shorter than the right intersecting point distance DR of the example shown in FIG. 10. Therefore, the right field-of-view value FOV_R of the example shown in FIG. 8 is smaller than the right field-of-view value FOV_R of the example shown in FIG. 10. That is, the right-side field of view from the own vehicle 100 to the traffic intersection 300 in the example shown in FIG. 8 is narrower than the right-side field of view from the own vehicle 100 to the traffic intersection 300 in the example shown in FIG. 10.

Therefore, the field-of-view value FOV decreases as the lateral distance (i.e., the distance between the own vehicle 100 and the interrupting object 400 existing on the side of the own vehicle 100) decreases.

Modified Example

Alternatively, the vehicle surrounding monitoring apparatus 10 may be configured to acquire the field-of-view value FOV as described below.

Figure 11:
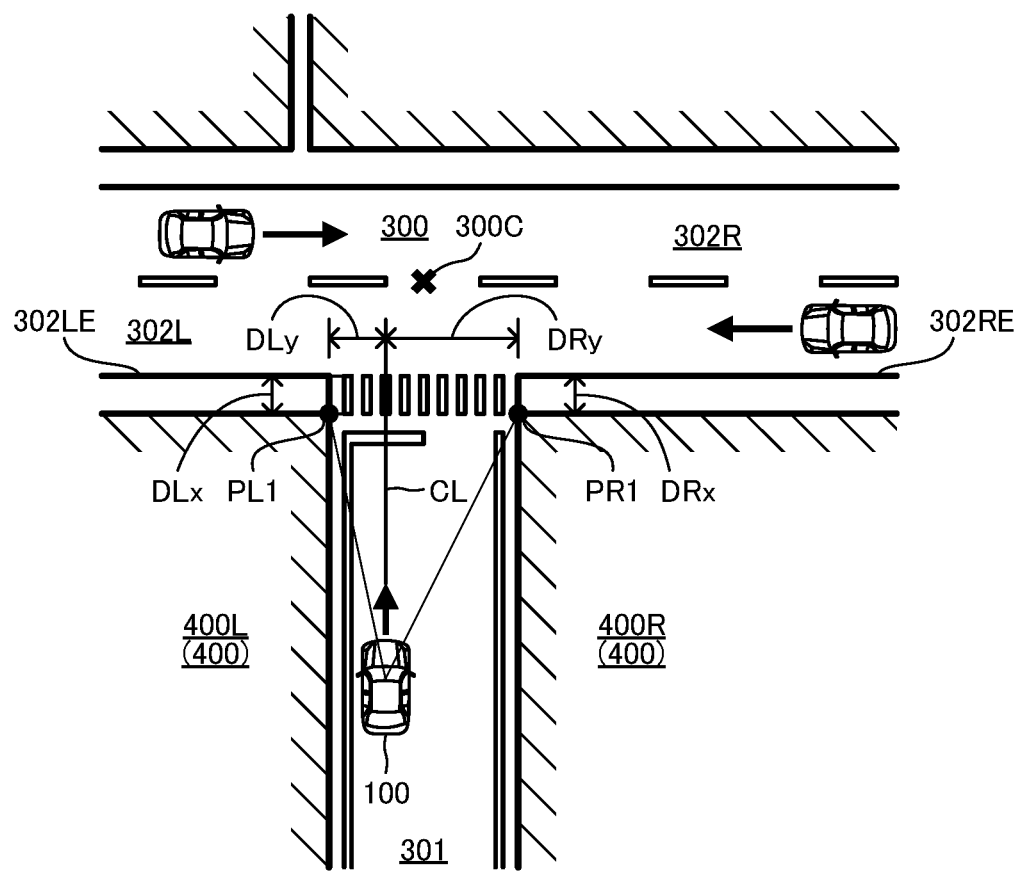
FIG. 11 is a view used for describing another method of acquiring the field-of-view value, and which shows a scene that the own vehicle has approached the traffic intersection.

When the traffic intersection 300 corresponds to a traffic intersection having the left side to which the road 302L connects, viewing from the own vehicle 100 as shown in FIG. 11, the vehicle surrounding monitoring apparatus 10 executes the process of detecting the left interrupting object 400L based on the surrounding detection information IS.

When the vehicle surrounding monitoring apparatus 10 detects the left interrupting object 400L, the vehicle surrounding monitoring apparatus 10 detects the left interrupting object end PL1 of the detected left interrupting object 400L based on the surrounding detection information IS.

Next, the vehicle surrounding monitoring apparatus 10 acquires a left intersecting road end distance DLx for the detected left interrupting object end PL1 based on the surrounding detection information IS. As shown in FIG. 11, the left intersecting road end distance DLx corresponds to a distance between the left interrupting object end PL1 and the left intersecting road end 302LE in the longitudinal direction of the own vehicle 100.

In addition, the vehicle surrounding monitoring apparatus 10 acquires a left interrupting object distance DLy for the detected left interrupting object end PL1 based on the surrounding detection information IS. As shown in FIG. 11, the left interrupting object distance DLy corresponds to a distance between the left interrupting object end PL1 and the own vehicle 100 in the vehicle width direction or the lateral direction of the own vehicle 100. In particular, in the present embodiment, the left interrupting object distance DLy corresponds to a distance between the left interrupting object end PL1 and the center line CL which extends in the longitudinal direction of the own vehicle 100.

Next, the vehicle surrounding monitoring apparatus 10 acquires a sum of the left intersecting road end distance DLx multiplied by a predetermined coefficient "a" greater than zero and the left interrupting object distance DLy multiplied by a predetermined coefficient "b" greater than zero as the left field-of-view value FOV_L (FOV_L=a*DLx+b*DLy).

The predetermined coefficients "a" and "b" correspond to suitably-set coefficients, respectively.

In other words, the vehicle surrounding monitoring apparatus 10 acquires the left field-of-view value FOV_L corresponding to a value which increases as the left interrupting object distance DLy increases and increases as the left intersecting road end distance DLx increases.

Similarly, when the traffic intersection 300 corresponds to a traffic intersection having the right side to which the road 302R connects, viewing from the own vehicle 100 as shown in FIG. 11, the vehicle surrounding monitoring apparatus 10 executes the process of detecting the right interrupting object 400R based on the surrounding detection information IS.

When the vehicle surrounding monitoring apparatus 10 detects the right interrupting object 400R, the vehicle surrounding monitoring apparatus 10 detects the right interrupting object end PR1 of the detected right interrupting object 400R based on the surrounding detection information IS.

Next, the vehicle surrounding monitoring apparatus 10 acquires a right intersecting road end distance DRx for the detected right interrupting object end PR1 based on the surrounding detection information IS. As shown in FIG. 11, the right intersecting road end distance DRx corresponds to a distance between the right interrupting object end PR1 and the right intersecting road end 302RE in the longitudinal direction of the own vehicle 100.

In addition, the vehicle surrounding monitoring apparatus 10 acquires a right interrupting object distance DRy for the detected right interrupting object end PR1 based on the surrounding detection information IS. As shown in FIG. 11, the right interrupting object distance DRy corresponds to a distance between the right interrupting object end PR1 and the own vehicle 100 in the vehicle width direction or the lateral direction of the own vehicle 100. In particular, in the present embodiment, the right interrupting object distance DRy corresponds to a distance between the right interrupting object end PR1 and the center line CL which extends in the longitudinal direction of the own vehicle 100.

Next, the vehicle surrounding monitoring apparatus 10 acquires a sum of the right intersecting road end distance DRx multiplied by a predetermined coefficient "c" greater than zero and the right interrupting object distance DRy multiplied by a predetermined coefficient "d" greater than zero as the right field-of-view value FOV_R (FOV_R=c*DRx+d DRy). The predetermined coefficients "c" and "d" correspond to suitably-set coefficients, respectively.

In other words, the vehicle surrounding monitoring apparatus 10 acquires the right field-of-view value FOV_R corresponding to a value which increases as the right interrupting object distance DRy increases and increases as the right intersecting road end distance DRx increases.

The acquired field-of-view value FOV decreases as the longitudinal distance decreases. The longitudinal distance corresponds to a distance between the traffic intersection 300 and the intersection-side end of the interrupting object 400 existing on the side of the own vehicle 100. The intersection-side end of the interrupting object 400 existing on the side of the own vehicle 100 corresponds to an end of the interrupting object 400 near the traffic intersection 300. In addition, the acquired field-of-view value FOV decreases as the lateral distance decreases. The lateral distance corresponds to a distance between the own vehicle 100 and the interrupting object 400 existing on the side of the own vehicle 100.

Figure 12:
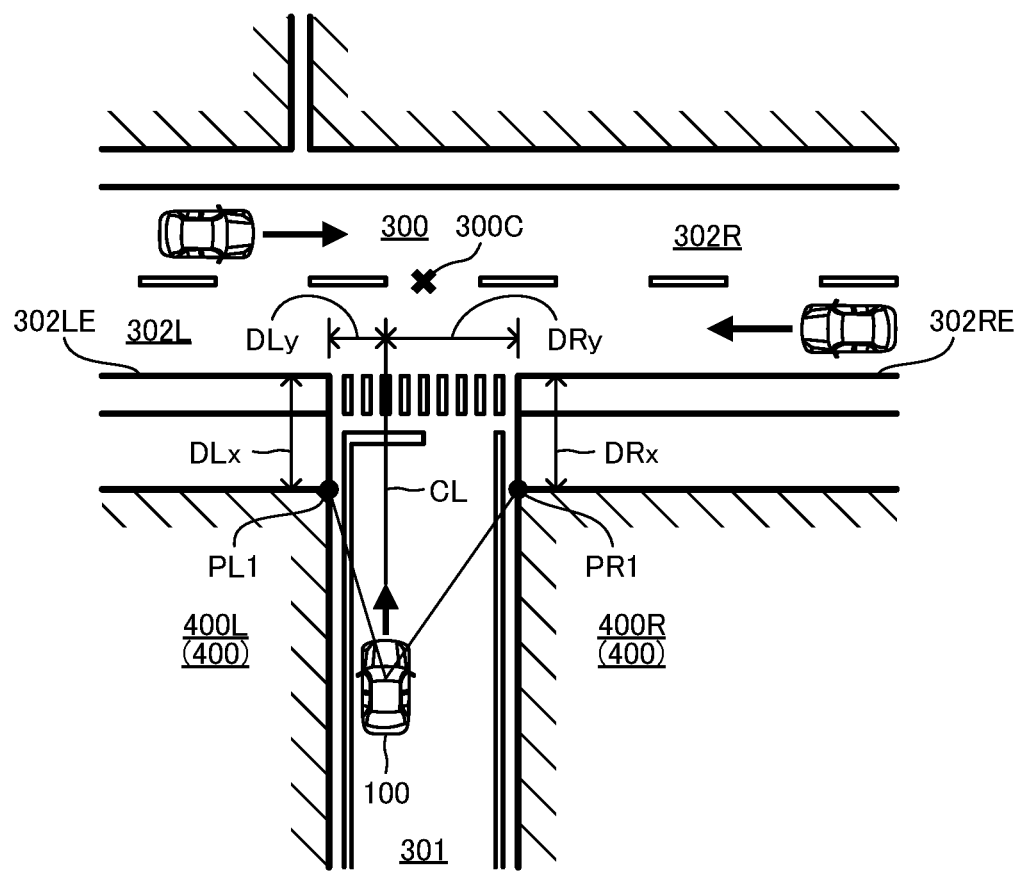
FIG. 12 is a view which shows a scene that the own vehicle has approached the traffic intersection and in which the distance between each interrupting object and the traffic intersection is greater than the distance between each interrupting object and the traffic intersection shown in FIG. 11.

That is, when comparing examples shown in FIG. 11 and FIG. 12, the left interrupting object end PL1 of the example shown in FIG. 11 is closer to the traffic intersection 300, compared with the left interrupting object end PL1 of the example shown in FIG. 12. In this case, the left intersecting road end distance DLx of the example shown in FIG. 11 is shorter than the left intersecting road end distance DLx of the example shown in FIG. 12. Therefore, the left field-of-view value FOV_L of the example shown in FIG. 11 is smaller than the left field-of-view value FOV_L of the example shown in FIG. 12. That is, the left-side field of view from the own vehicle 100 to the traffic intersection 300 in the example shown in FIG. 11 is narrower than the left-side field of view from the own vehicle 100 to the traffic intersection 300 in the example shown in FIG. 12.

Similarly, when comparing the examples shown in FIG. 11 and FIG. 12, the right interrupting object end PR1 of the example shown in FIG. 11 is closer to the traffic intersection 300, compared with the right interrupting object end PR1 of the example shown in FIG. 12. In this case, the right intersecting road end distance DRx of the example shown in FIG. 11 is shorter than the right intersecting road end distance DRx of the example shown in FIG. 12. Therefore, the right field-of-view value FOV_R of the example shown in FIG. 11 is smaller than the right field-of-view value FOV_R of the example shown in FIG. 12. That is, the right-side field of view from the own vehicle 100 to the traffic intersection 300 in the example shown in FIG. 11 is narrower than the right-side field of view from the own vehicle 100 to the traffic intersection 300 in the example shown in FIG. 12.

Therefore, the field-of-view value FOV decreases as the longitudinal distance (i.e., the distance between the traffic intersection 300 and the intersection-side end of the interrupting object 400 existing on the side of the own vehicle 100, which end being near the traffic intersection 300) decreases.

Figure 13:
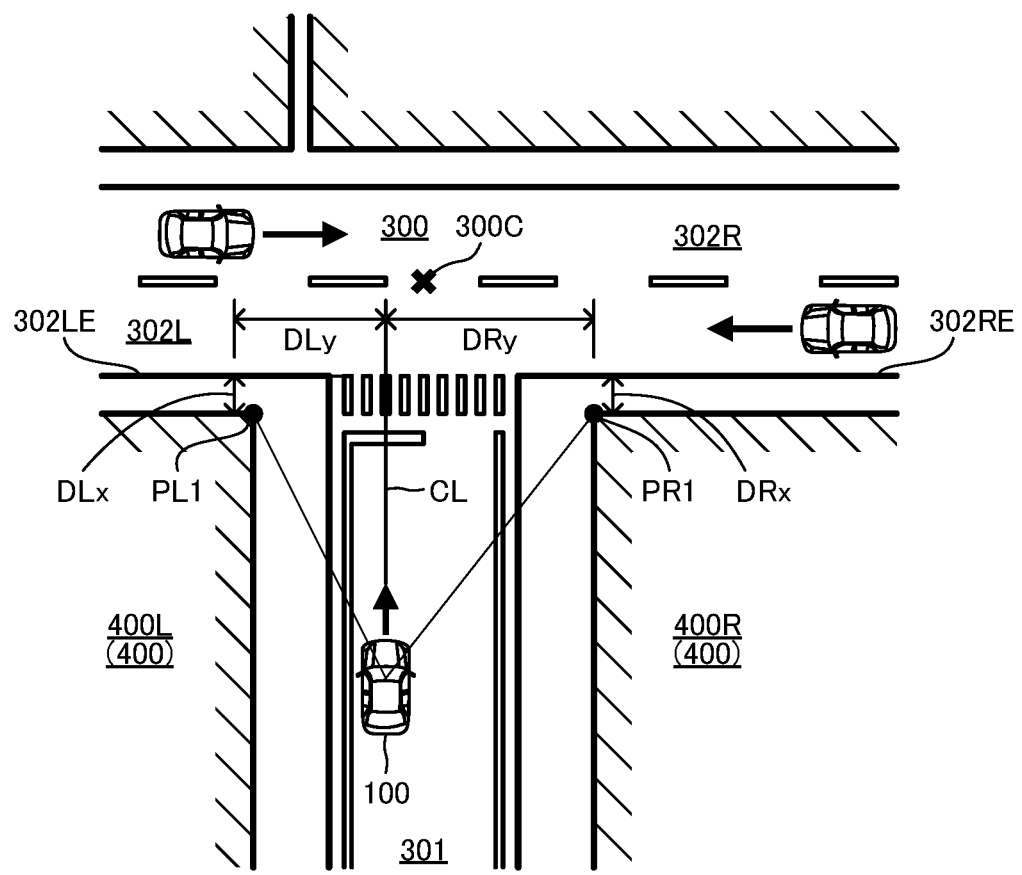
FIG. 13 is a view which shows a scene that the own vehicle has approached the traffic intersection and in which the distance between each interrupting object and the own vehicle is greater than the distance between each interrupting object and the own vehicle shown in FIG. 11.

Further, when comparing the example shown in FIG. 11 and an example shown in FIG. 13, the left interrupting object end PL1 of the example shown in FIG. 11 is closer to the own vehicle 100, compared with the left interrupting object end PL1 of the example shown in FIG. 13. In this case, the left interrupting object distance DLy of the example shown in FIG. 11 is shorter than the left interrupting object distance DLy of the example shown in FIG. 13. Therefore, the left field-of-view value FOV_L of the example shown in FIG. 11 is smaller than the left field-of-view value FOV_L of the example shown in FIG. 13. That is, the left-side field of view from the own vehicle 100 to the traffic intersection 300 in the example shown in FIG. 11 is narrower than the left-side field of view from the own vehicle 100 to the traffic intersection 300 in the example shown in FIG. 13.

Similarly, when comparing the examples shown in FIG. 11 and FIG. 13, the right interrupting object end PR1 of the example shown in FIG. 11 is closer to the own vehicle 100, compared with the right interrupting object end PR1 of the example shown in FIG. 13. In this case, the right interrupting object distance DRy of the example shown in FIG. 11 is shorter than the right interrupting object distance DRy of the example shown in FIG. 13. Therefore, the right field-of-view value FOV_R of the example shown in FIG. 11 is smaller than the right field-of-view value FOV_R of the example shown in FIG. 13. That is, the right-side field of view from the own vehicle 100 to the traffic intersection 300 in the example shown in FIG. 11 is narrower than the right-side field of view from the own vehicle 100 to the traffic intersection 300 in the example shown in FIG. 13.

Therefore, the field-of-view value FOV decreases as the lateral distance (i.e., the distance between the own vehicle 100 and the interrupting object 400 existing on the side of the own vehicle 100) decreases.

When the vehicle surrounding monitoring apparatus 10 determines "Yes" at the step S515, the vehicle surrounding monitoring apparatus 10 proceeds with the process to a step S520 to determine whether a first additional displaying condition C1 is satisfied. The first additional displaying condition C1 corresponds to a condition or a vehicle moving speed condition that the own vehicle moving speed V is equal to or smaller than a predetermined speed or a predetermined speed threshold Vth. It should be noted that the first additional displaying condition C1 is an optional condition. Therefore, a determination process of the step S520 may be omitted.

It should be noted that the driver normally decelerates the own vehicle 100 when the own vehicle 100 has approached the traffic intersection 300 in a situation where the own vehicle 100 is moving on the non-priority road. Therefore, in the situation where the own vehicle 100 is moving on the non-priority road, the surrounding image IMG_S does not need to be displayed by the displaying device 30 when the own vehicle moving speed V (i.e., the moving speed of the own vehicle 100) is great.

On the other hand, even when the own vehicle 100 has approached the traffic intersection 300 in a situation where the own vehicle 100 is moving on the priority road, the driver does not always decelerate the own vehicle 100 unless a traffic signal or the like restricts a movement of the own vehicle 100. Therefore, when the own vehicle 100 is moving on the priority road, the surrounding image IMG_S should be displayed by the displaying device 30, independently of the own vehicle moving speed V (i.e., the moving speed of the own vehicle 100).

Accordingly, the vehicle surrounding monitoring apparatus 10 may be configured to execute the determination process of the step S520 when the own vehicle 100 is moving on the non-priority road, and omit the determination process of the step S520 when the own vehicle 100 is moving on the priority road.

Further, in this case, the predetermined traffic intersection distance threshold Dth in the traffic intersection condition Cis determined at the step S515 when the own vehicle 100 is moving on the non-priority road, may be different from the predetermined traffic intersection distance threshold Dth in the traffic intersection condition Cis determined at the step S515 when the own vehicle 100 is moving on the priority road. In particular, when the own vehicle 100 is moving on the non-priority road, the traffic intersection condition Cis may be set to a condition that the traffic intersection distance D is equal to or smaller than a first traffic intersection distance threshold D1, and when the own vehicle 100 is moving on the priority road, the traffic intersection condition Cis may be set to a condition that the traffic intersection distance D is equal to or smaller than a second traffic intersection distance threshold D2. It should be noted that in this case, the second traffic intersection distance threshold D2 is greater than the first traffic intersection distance threshold D1.

Thereby, in a situation where the own vehicle 100 is moving on the non-priority road, the surrounding image IMG_S is displayed by the displaying device 30 when at least the vehicle speed condition that the own vehicle moving speed V is equal to or smaller than the predetermined speed threshold Vth, is satisfied. In other words, the surrounding image IMG_S is not displayed by the displaying device 30 when the own vehicle moving speed V is greater than the predetermined speed threshold Vth, and thus the surrounding image IMG_S does not need to be displayed by the displaying device 30. Thus, unnecessarily displaying the surrounding image IMG_S can be prevented.

On the other hand, in a situation where the own vehicle 100 is moving on the priority road, the determination process of the step S520 is omitted. Thus, the surrounding image IMG_S is displayed, independently of the own vehicle moving speed V (i.e., the moving speed of the own vehicle 100) when the predetermined condition becomes satisfied. Thus, the surrounding image IMG_S can be suitably displayed.

When the vehicle surrounding monitoring apparatus 10 determines "Yes" at the step S520, the vehicle surrounding monitoring apparatus 10 proceeds with the process to a step S525 to determine whether a second additional displaying condition C2 is satisfied. The second additional displaying condition C2 corresponds to a display usage condition, i.e., a condition that the driver of the own vehicle 100 uses the display 31.

The vehicle surrounding monitoring apparatus 10 determines that the second additional displaying condition C2 is not satisfied when a predetermined period of time or a predetermined non-operation period of time Top or more elapses since the last touch interaction is applied to the display 31.

It should be noted that the vehicle surrounding monitoring apparatus 10 may be configured to determine whether the driver of the own vehicle 100 uses the display 31 based on the driver image information ID. In this case, for example, the vehicle surrounding monitoring apparatus 10 determines that the second additional displaying condition C2 is not satisfied when a predetermined period of time or a predetermined non-viewing period of time Tvc or more elapses since the vehicle surrounding monitoring apparatus 10 determines that the driver does not view the display 31 based on the driver image information ID. It should be noted that the second additional displaying condition C2 is an optional condition. Therefore, a determination process of the step S525 may be omitted.

When the vehicle surrounding monitoring apparatus 10 determines "No" at the step S525, the vehicle surrounding monitoring apparatus 10 proceeds with the process to a step S530 to display the surrounding image IMG_S on the display 31 by the displaying device 30. The surrounding image IMG_S displayed in this case corresponds to an image which is produced based on the image information IC and shows the views on the left side, the front side, and the right side of the own vehicle 100. Further, the surrounding image IMG_S displayed in this case corresponds to an image which shows areas corresponding to the blind areas for the driver of the own vehicle 100.

It should be noted that when the vehicle surrounding monitoring apparatus 10 determines that the left field-of-view value FOV_L is equal to or smaller than a predetermined left field-of-view threshold FOV_Lth, and the right field-of-view value FOV_R is greater than a predetermined right field-of-view threshold FOV_Rth, the vehicle surrounding monitoring apparatus 10 may display a left surrounding image IMG_L as the surrounding image IMG_S on the display 31 by the displaying device 30 at the step S515. The left surrounding image IMG_L corresponds to an image which is produced based on the image information IC and shows the view on the left side of the own vehicle 100.

Further, when the vehicle surrounding monitoring apparatus 10 determines that the left field-of-view value FOV_L is greater than the predetermined left field-of-view threshold FOV_Lth, and the right field-of-view value FOV_R is equal to or smaller than the predetermined right field-of-view threshold FOV_Rth, the vehicle surrounding monitoring apparatus 10 may display a right surrounding image IMG_R as the surrounding image IMG_S on the display 31 by the displaying device 30 at the step S515. The right surrounding image IMG_R corresponds to an image which is produced based on the image information IC and shows the view on the right side of the own vehicle 100.

Next, the vehicle surrounding monitoring apparatus 10 proceeds with the process to a step S535 to set the value of the surrounding image displaying flag X1 to "1". Then, the vehicle surrounding monitoring apparatus 10 proceeds with the process to a step S595 to terminate executing this routine once.

On the other hand, when the vehicle surrounding monitoring apparatus 10 determines "No" at the step S510, the step S515, or the step S520, or the vehicle surrounding monitoring apparatus 10 determines "Yes" at the step S525, the vehicle surrounding monitoring apparatus 10 proceeds with the process directly to the step S595 to terminate executing this routine once.

Further, when the vehicle surrounding monitoring apparatus 10 determines "No" at the step S505, the vehicle surrounding monitoring apparatus 10 proceeds with the process to a step S540 to determine whether a displaying termination condition Cend is satisfied. The displaying termination condition Cend corresponds to a condition that a situation for terminating displaying the surrounding image IMG_S by the displaying device 30 occurs. In the present embodiment, the vehicle surrounding monitoring apparatus 10 determines that the displaying termination condition Cend becomes satisfied (i) when the automatic displaying function OFF switch 42 is operated, and the automatic displaying function is requested to be put in the OFF-state, or (ii) when a voice to request to put the automatic displaying function in the OFF-state, is detected based on the voice information IV, or (iii) when the own vehicle moving speed V becomes equal to or greater than a predetermined speed or a predetermined displaying termination speed threshold Vend, or (iv) when a predetermined period of time or a predetermined displaying termination period of time Tend elapses since the surrounding image IMG_S starts to be displayed by the displaying device 30, or (v) when the vehicle surrounding monitoring apparatus 10 determines that the own vehicle 100 has passed the traffic intersection 300 based on the road information IR, or (vi) when the accelerator pedal operation amount AP becomes equal to or greater than a predetermined operation amount or a predetermined displaying termination operation amount threshold APend, or (vii) when the brake pedal operation amount BP becomes equal to or greater than a predetermined operation amount or a predetermined displaying termination operation amount threshold BPend, or (viii) when the steering angle θ becomes equal to or greater than a predetermined value or a predetermined display termination steering angle threshold @end.

It should be noted that the vehicle surrounding monitoring apparatus 10 may be configured to determine whether the own vehicle 100 has passed the traffic intersection 300 based on the object information IO, not based on the road information IR. In this case, in order to improve a determination accuracy, the vehicle surrounding monitoring apparatus 10 may be configured to determine that the own vehicle 100 has passed the traffic intersection 300 only when a distance that the own vehicle 100 has moved since the vehicle surrounding monitoring apparatus 10 detects the traffic intersection 300, is greater than the traffic intersection distance D acquired at a point of time when the vehicle surrounding monitoring apparatus 10 detects the traffic intersection 300.

When the vehicle surrounding monitoring apparatus 10 determines "Yes" at the step S540, the vehicle surrounding monitoring apparatus 10 proceeds with the process to a step S545 to terminate displaying the surrounding image IMG_S by the displaying device 30.

Next, the vehicle surrounding monitoring apparatus 10 proceeds with the process to a step S550 to set the value of the surrounding image displaying flag X1 to "0". Then, the vehicle surrounding monitoring apparatus 10 proceeds with the process to the step S595 to terminate executing this routine once.

With the vehicle surrounding monitoring apparatus 10, the surrounding image IMG_S is displayed only when the own vehicle 100 has approached the traffic intersection 300, and the field of view to the traffic intersection 300 is narrow. Thus, the driver can be prevented from feeling bothersome due to a face that the surrounding image IMG_S is displayed.

It should be noted that the invention is not limited to the aforementioned embodiments, and various modifications can be employed within the scope of the invention.

What is claimed is:

1. A vehicle surrounding monitoring apparatus, comprising:
    an image acquisition device comprising a plurality of cameras and which acquires a surrounding image corresponding to an image of a view around an own vehicle;
    a displaying device comprising a display and which displays the surrounding image; and
    an electronic control unit comprising a processor which executes instructions stored on a memory to control activations of the displaying device,
    wherein the electronic control unit is configured to display the surrounding image by the displaying device when the own vehicle has approached a traffic intersection, and a displaying condition becomes satisfied,
    wherein the displaying condition corresponds to a condition that a field-of-view value is equal to or smaller than a predetermined field-of-view value, and
    wherein the field-of-view value corresponds to a value which represents a field of view from the own vehicle to the traffic intersection based on a lateral distance between the own vehicle and an intersecting point on an intersecting road of the traffic intersection.

2. The vehicle surrounding monitoring apparatus as claimed in claim 1,
    wherein the field-of-view value corresponds to a value which decreases as a first lateral distance decreases, and decreases as a longitudinal distance decreases,
    wherein the first lateral distance corresponds to a distance between the own vehicle and a lateral end of a road on which the own vehicle is moving, and
    wherein the longitudinal distance corresponds to a distance between the traffic intersection and an intersection-side end of an interrupting object existing on the side of the own vehicle, and the intersection-side end corresponds to an end of the interrupting object close to the traffic intersection.

3. The vehicle surrounding monitoring apparatus as claimed in claim 1, wherein the electronic control unit is configured to determine whether the own vehicle has approached the traffic intersection based on the surrounding image and acquire the field-of-view value based on the surrounding image.

4. The vehicle surrounding monitoring apparatus as claimed in claim 1, wherein the electronic control unit is configured to determine that the own vehicle has approached the traffic intersection when the electronic control unit detects at least one of a road sign and a road surface marking which show that the traffic intersection exists ahead of the own vehicle.

5. The vehicle surrounding monitoring apparatus as claimed in claim 1,
wherein the displaying condition includes (i) a condition that the own vehicle is moving on a non-priority road, (ii) a condition that an intersection distance is equal to or smaller than a first intersection distance threshold, and (iii) a condition that a moving speed of the own vehicle is equal to or smaller than a predetermined speed threshold,
wherein the intersection distance corresponds to a distance between the own vehicle and the traffic intersection, and
wherein the displaying condition includes (i) a condition that the own vehicle is moving on a priority road and (ii) a condition that the intersection distance is equal to or smaller than a second intersection distance threshold, but does not include any condition relating to the moving speed of the own vehicle.

6. The vehicle surrounding monitoring apparatus as claimed in claim 1,
wherein the electronic control unit is configured to terminate displaying the surrounding image by the displaying device when a displaying termination condition becomes satisfied, and
wherein the displaying termination condition includes at least one of:
(i) a condition that a driver of the own vehicle requests to terminate displaying the surrounding image by the displaying device;
(ii) a condition that a moving speed of the own vehicle is equal to or greater than a displaying termination speed threshold;
(iii) a condition that a displaying duration period of time is equal to or greater than a displaying termination period-of-time threshold; and
(iv) a condition that the electronic control unit determines that the own vehicle has passed the traffic intersection based on a position of the own vehicle and map information, and
wherein the displaying duration period of time corresponds to a period of time which elapses since the surrounding image starts being displayed by the displaying device.

7. The vehicle surrounding monitoring apparatus as claimed in claim 1,
wherein the electronic control unit is configured to:
detect an interrupting object that is closest to the traffic intersection,
detect the intersecting point as a point, on the intersecting road of the traffic intersection, that corresponds to a reference line between the own vehicle and the interrupting object, and
determine the field of view value based on the lateral distance between the own vehicle and the intersecting point.

8. A vehicle surrounding monitoring method for acquiring a surrounding image corresponding to an image of a view around an own vehicle by an image acquisition device that includes a plurality of cameras, and displaying the surrounding image by a displaying device that includes a display,
wherein the vehicle surrounding monitoring method comprises:
determining whether the own vehicle has approached a traffic intersection;
determining whether a display condition is satisfied; and
displaying the surrounding image by the displaying device based on determining that the own vehicle has approached the traffic intersection, and based on determining that the displaying condition is satisfied,
wherein the displaying condition corresponds to a condition that a field-of-view value is equal to or smaller than a predetermined field-of-view value, and
wherein the field-of-view value corresponds to a value which represents a field of view from the own vehicle to the traffic intersection based on a lateral distance between the own vehicle and an intersecting point on an intersecting road of the traffic intersection.

9. A non-transitory computer-readable storage medium storing a vehicle surrounding monitoring program of acquiring a surrounding image corresponding to an image of a view around an own vehicle by an image acquisition device that includes a plurality of cameras, and displaying the surrounding image by a displaying device that includes a display,
wherein the vehicle surrounding monitoring program is configured to;
determine whether the own vehicle has approached a traffic intersection;
determine whether a display condition is satisfied; and
display the surrounding image by the displaying device based on determining that the own vehicle has approached a traffic intersection, and based on determining that the displaying condition is satisfied,
wherein the displaying condition corresponds to a condition that a field-of-view value is equal to or smaller than a predetermined field-of-view value, and
wherein the field-of-view value corresponds to a value which represents a field of view from the own vehicle to the traffic intersection based on a lateral distance between the own vehicle and an intersecting point on an intersecting road of the traffic intersection.

* * * * *